May 5, 1936. S. S. CRAMER 2,039,706

HELICAL GEAR AND PROCESS OF MAKING SAME

Filed Nov. 30, 1934

INVENTOR
Stanley S. Cramer.
BY
A. D. T. Libby
ATTORNEY

Patented May 5, 1936

2,039,706

UNITED STATES PATENT OFFICE 2,039,706

HELICAL GEAR AND PROCESS OF MAKING SAME

Stanley S. Cramer, Haddon Heights, N. J., assignor to Radio Condenser Company, Camden, N. J.

Application November 30, 1934, Serial No. 755,350

4 Claims. (Cl. 74—445)

This invention relates to a helical gear and the process of constructing the same.

It is the principal object of my invention to provide a helical gear which can be made with the simplest kind of machinery or apparatus and without the use of special cutters or complicated dies.

I have found, after considerable study, that it is possible to construct a helical gear having a pre-determined desired helix or pitch from laminations having plain spur teeth thereon. Since spur teeth are relatively simple in their design and may be readily punched on the periphery of a piece of suitable material of a chosen thickness, a gear constructed according to my process from such discs or laminations, may be made very cheaply.

My invention will be readily understood by reference to the annexed drawing, wherein.

Figure 1:
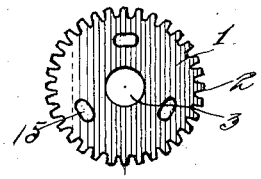
Figure 1 is a plan view of a lamination or disc having spur teeth which may be punched directly from the stock from which the gear lamination is made.
Figure 8:
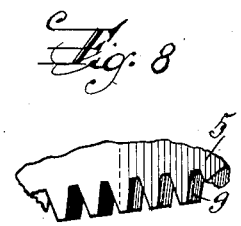
Figure 8 is an enlarged view looking down on one of the assembly blocks of the fixture of Figure 2.

In the various views, 1 is a gear having spur teeth 2 and a center mounting hole 3. For the purpose of my process of making a helical gear from such a gear as shown in Figure 1, the gear 1 is made of any suitable relatively thin material—for example, in some cases I prefer to make this gear of non-metallic material such as fibrous material treated with some compound, micarta being illustrative of such an arrangement. When using micarta, I may use a thickness of material varying from .015" to .025", but I do not wish to be limited by these thicknesses, they being merely illustrative of thicknesses of material which I have successfully used in practice.

Figure 2:
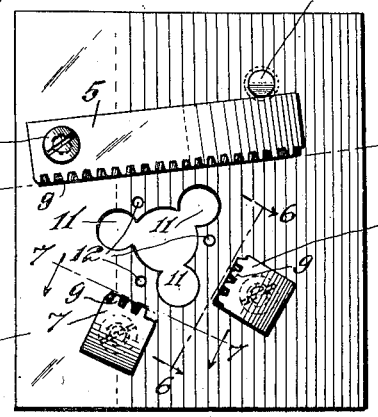
Figure 2 is a plan view of a fixture which may be used in making the helical gear from the spur gear shown in Figure 1.
Figure 4:
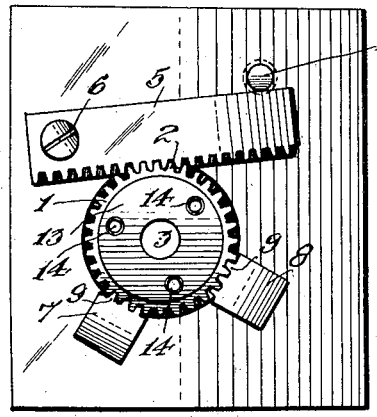
Figure 4 is a view similar to Figure 3, but showing a binding or clamping plate with fastening means for holding the stack of laminations comprising the gear in position.
Figure 5:
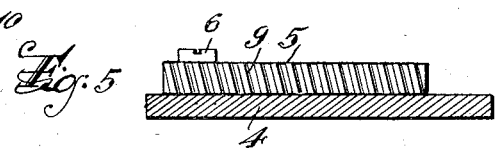
Figure 5 is a view on the line 5—5 of Figure 2.
Figure 6:
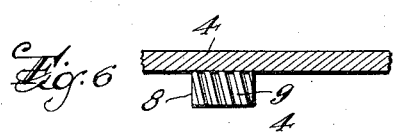
Figure 6 is a view on the line 6—6 of Figure 2, with the fixture tipped toward the observer at an angle of ninety degrees.
Figure 7:
Figure 7 is a view on the line 7—7 of Figure 2, considered as in Figure 6.

In carrying out my process of construction of the helical gear, I provide a fixture plate 4 having mounted thereon a plurality of assembly blocks. One of these blocks, 5, is preferably pivotally mounted to the plate 4 as by screw 6. I have found it advisable to use additional blocks 7 and 8 which may be screwed or riveted in permanently fixed position to the plate 4 in a manner as illustrated in Figure 2. Each of the blocks 5, 7 and 8 have teeth 9 cut or formed along one side or edge thereof. The teeth 9 are cut or formed at an angle to conform to the helix or pitch of the worm with which the helical gear is to function. In order to facilitate initial assembly, the block 5 is pivotally mounted on the plate 4 as has been already noted, and the plate 4 is provided with a hole 10 to receive a stop pin for permanently locating the free end of the block 5.

Figure 3:
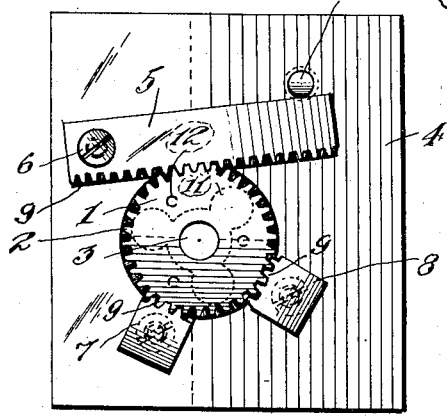
Figure 3 is a view of the fixture of Figure 2, but with a stack of spur gear discs of Figure 1 in position thereon.

With the blocks 5, 7 and 8 in position, the laminations or discs 1 are stacked on the fixture between the blocks as shown in Figure 3, over the opening 11 in the plate 4 and over the jig holes 12. After a sufficient number of laminations have been stacked to give the desired thickness of gear, a clamp may be applied to the outer lamination and the fixture turned over and a drill passed through the jig holes 12 through the stack of laminations. Then a stiff metal binding plate 13 having holes already formed therein according to the spacing of the jig holes 12, is applied to the top of the stack together with fastening means 14 which may be solid or eyelet type of rivets, the latter being illustrated. Then the pin may be removed from the hole 10 and the block 5 swung away from the stack, which can then be removed and another binding plate 13 applied to what was the bottom of the stack, and the fastening means set up into final locking position, thereby completing the gear.

Figure 9:
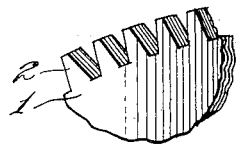
Figure 9 is an enlarged perspective view of a portion of the completed helical gear.
Figure 10:
Figure 10 is an enlarged view of one of the gear-teeth shown in Figure 9.

Due to the helical pitch of the teeth 9, each disc 1 as it is stacked on the fixture will be arcuately turned on the common axis to positions as illustrated in Figures 9 and 10, with the result that a helical gear is obtained as described.

Instead of the process of assembly as described, it is within the purview of my invention to place the bottom binding plate 13 on the fixture by use of a proper locating pin, so that the holes therein will register with the jig holes 12, so that after the fastening means 14 are inserted in position they will then protrude through the bottom binding plate. While it is preferable to punch the holes in the plates 13 when they are made, the plates may be plain blanks and drilled at the same time that the lamination stack is drilled. Furthermore, the gear discs may have holes 15 punched therein when the disc is blanked out, in which case the holes 15 are large enough to allow for the angular displacement of the disc so that when the stack of discs is completed the fastening means 14 can be inserted through these holes and the holes in the binding plates 13, but such steps are all contemplated by my process.

What I claim is:

1. A helical gear composed of a plurality of relatively thin laminations securely held together and each of which is provided with spur-shaped teeth, the said laminations being successively turned on a common axis whereby the spur teeth take up displaced angular positions in accordance with the pitch of the worm with which the gear is to function.

2. A helical gear composed of a plurality of relatively thin laminations each of which is provided with spur-shaped teeth, the laminations being successively arcuately turned on a common axis according to the pitch of the worm with which the gear is to function, said laminations being held together by outside binding plates with means for holding the binding plates in position.

3. A helical gear as set forth in claim 2, further characterized in that the laminations are of non-metallic material while the binding plates are of metal.

4. A helical gear made up of laminations securely held together and each having spur teeth, laminations being uniformly arcuately offset according to the helix desired.

STANLEY S. CRAMER.